US009759287B2

(12) United States Patent
Exner et al.

(10) Patent No.: US 9,759,287 B2
(45) Date of Patent: Sep. 12, 2017

(54) TORQUE-TRANSMITTING COUPLING

(71) Applicant: CENTA-ANTRIEBE KIRSCHEY GmbH, Haan (DE)

(72) Inventors: Jochen Exner, Hennef (DE); Mahamudul Hasan, Bochum (DE); Martin Fitsch, Wuppertal (DE); Norbert Hartmann, Cologne (DE); Martin Bach, Mettmann (DE)

(73) Assignee: CENTA-ANTRIEBE KIRSCHEY GMBH, Haan (DE)

( * ) Notice: Subject to any disclaimer, the term of this patent is extended or adjusted under 35 U.S.C. 154(b) by 0 days.

(21) Appl. No.: 14/817,003

(22) Filed: Aug. 3, 2015

(65) Prior Publication Data
US 2016/0076620 A1 Mar. 17, 2016

(30) Foreign Application Priority Data

Sep. 17, 2014 (DE) .................. 10 2014 013 453

(51) Int. Cl.
| | |
|---|---|
| *F16D 3/78* | (2006.01) |
| *F16F 15/12* | (2006.01) |
| *F16D 3/74* | (2006.01) |
| *F16F 15/18* | (2006.01) |
| *F16D 3/12* | (2006.01) |
| *H02K 49/04* | (2006.01) |
| *F16D 27/00* | (2006.01) |

(52) U.S. Cl.
CPC ............ *F16F 15/1202* (2013.01); *F16D 3/12* (2013.01); *F16D 3/74* (2013.01); *F16F 15/18* (2013.01); *H02K 49/046* (2013.01); *F16D 27/004* (2013.01); *Y10T 74/2127* (2015.01); *Y10T 464/50* (2015.01)

(58) Field of Classification Search
CPC  F16D 3/74; F16D 3/76; F16F 15/1202; F16F 15/18; Y10T 74/2127; Y10T 464/50
USPC ......... 464/2, 5, 6, 29, 51, 92, 180; 74/574.1, 74/574.2, 572.21
See application file for complete search history.

(56) References Cited

U.S. PATENT DOCUMENTS

| | | | |
|---|---|---|---|
| 3,791,497 | A | 2/1974 | Fleischmann et al. |
| 5,185,543 | A | 2/1993 | Tebbe |
| 6,209,692 | B1 | 4/2001 | Pels et al. |
| 7,347,122 | B2 * | 3/2008 | Clausin .................. F16F 15/18 |
| | | | 74/574.1 X |

(Continued)

FOREIGN PATENT DOCUMENTS

GB          1378056 A    12/1974

*Primary Examiner* — Gregory Binda
(74) *Attorney, Agent, or Firm* — Andrew Wilford

(57) ABSTRACT

A coupling for transmitting torque from a drive to a load has a first connection for connection with the drive, a second connection for connection with the load, and an elastic element for vibration damping and between the first and second connections in the energy transmission path therebetween. An actuator carried on the elastic element has a base body and a centrifugal mass body rotatable relative thereto. One of the two bodies carries an electrical conductor and the other of the two bodies carries a permanent magnet. The conductor is in a magnetic field of the permanent magnet. Thus a flow of current through the conductor makes the centrifugal mass body exert an angular force on the base body to compensate for rotational vibrations.

10 Claims, 7 Drawing Sheets

(56) References Cited

U.S. PATENT DOCUMENTS 7,584,685 B2 * 9/2009 Crist ...................... F16F 1/361
74/574.1

* cited by examiner

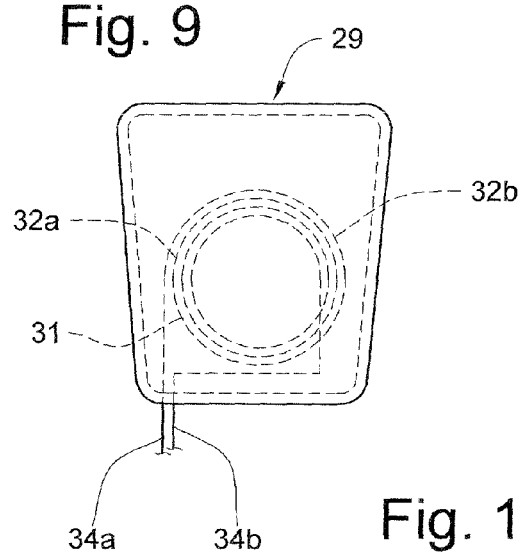
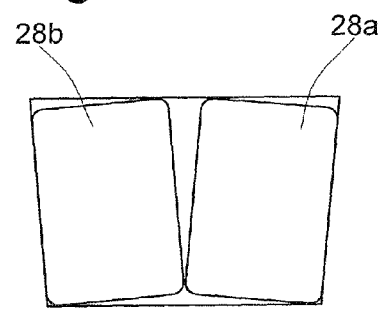
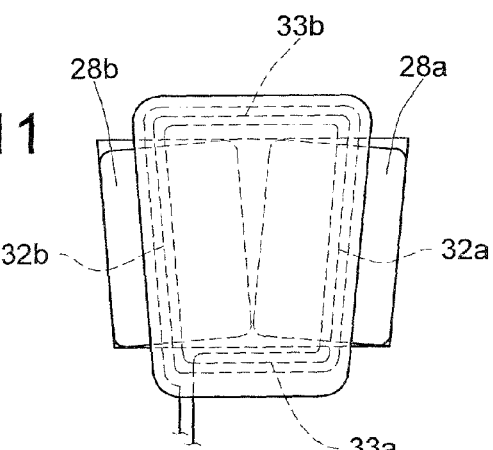
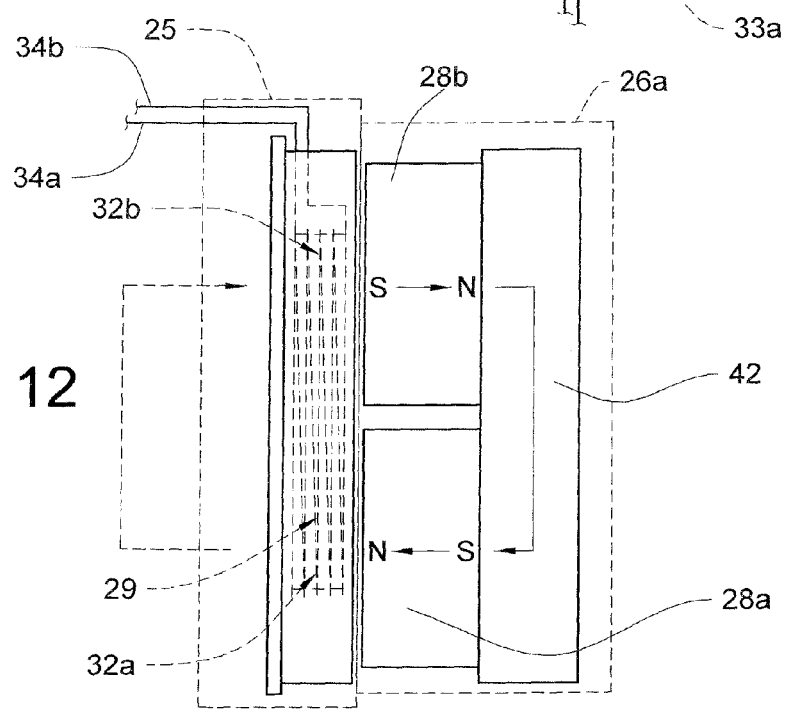

TORQUE-TRANSMITTING COUPLING

CROSS REFERENCE TO RELATED APPLICATIONS

This application claims the priority of German patent application 10 2014 013 453.6 filed 17 Sep. 2014.

FIELD OF THE INVENTION

The invention relates to a torque-transmitting coupling for transmitting torque from a drive to a load and comprising a first connection in particular a flange connectable with the drive, a second connection in particular a flange connectable with the load, and at least one elastic element for vibration damping and between the two connections in the energy-transmission path.

BACKGROUND OF THE INVENTION

Such devices have been developed and marketed by the applicant for decades.

The devices of the generic type serve for example for transmitting torque from a motor to a gear.

In order to be able to compensate or at least reduce rotational vibrations occurring in such a drive train, the known coupling has an elastic element for vibration damping.

It is also known to construct devices with several elastic elements.

The elastic elements can be coordinated to particular application purposes with regard to their construction and with regard to the choice of the materials that are used. In particular, a coordination to particular frequencies or frequency ranges is possible, in order to be able to contribute to the vibration damping in an optimized manner.

Devices of the generic type are also designated as shaft couplings and, with regard to the use of elastic elements, also as elastic shaft couplings.

OBJECT OF THE INVENTION

The object of the invention is to provide an elastic shaft coupling of the type described above such that an improved rotational vibration compensation becomes possible.

SUMMARY OF THE INVENTION

According to the invention the coupling has an actuator with at least one base body and with a centrifugal mass body rotatable relative thereto, one of the two bodies carrying at least one conductor element the other of the two bodies carrying at least one permanent magnet, the being positioned in the magnetic field such that, with a flow of current through it, the base body is able to be acted upon with an angular momentum generated by the centrifugal mass body in the sense that compensates for rotary vibrations.

The principle of the invention consists substantially in that the device also has an actuator in addition to the elastic element.

A suitable actuator is described for example in the subsequently published DE 10 2014 013 322.2.

The invention combines such an actuator that is described there with an elastic element. As a result of this combination, an improved compensation of rotational vibrations in the drive train can be achieved.

According to the invention, the actuator has at least one base body and a centrifugal mass body rotatable relative thereto.

The base body is connected in a torque-proof manner with the elastic element, in particular in a torque-proof manner with one of the two connection sides of the elastic element. The centrifugal mass body is rotatable relative to the base body.

Advantageously, the centrifugal mass body can be rotatably mounted directly on the base body. Alternatively, a rotatable mounting of the centrifugal mass body on a fixed bearing is also conceivable.

Preferred embodiments are described below, in which the centrifugal mass body is rotatably mounted directly on the base body.

According to the invention, at least one conductor is on one of the two bodies—base body and centrifugal mass body. At least one permanent magnet is on the other of the two bodies. Any electrically conducting conductor that is able to be flowed through by a current is regarded as a conductor in the sense of the present invention. Any element that can generate a magnetic, in particular static, field is regarded as a permanent magnet in the sense of the present patent application.

According to the invention, the conductor is able to be positioned in the magnetic field such that with a flow of current through the conductor the centrifugal mass body can generate an angular momentum and can act upon the base body with this angular momentum. The action upon the base body with an angular momentum by the centrifugal mass body takes place in the sense of a compensation of rotational vibrations on the drive train.

According to the invention, the conductor is able to be positioned permanently or at least temporarily in the magnetic field. For the case where the centrifugal mass body is mounted rotatably on the base body, and consequently rotates therewith, the centrifugal mass body can be pre-stressed relative to the base body with the aid of spring elements into a relative rest position. Furthermore, provision can be made that the centrifugal mass body can be rotated in a relative manner relative to the base body proceeding from the rest position in both directions of rotation along a predetermined maximum circumferential angle range.

Assuming that the conductor loop is on the base body and a corresponding permanent magnet, or a plurality of permanent magnets, are on the centrifugal mass body, the effect according to the invention occurs as follows:

The conductor advantageously runs substantially in radial direction and, with the centrifugal mass body situated in the rest position, the permanent magnet is positioned such that the magnetic field substantially completely sweeps over the conductor. With a flow of current through the conductor, as a result of the Lorentz force a relative exertion of force can take place such that the centrifugal mass body is set in rotation relative to the base body. The angular momentum occurring here can be used in the sense of a compensation angular momentum for the compensation of rotational vibrations on the drive train.

The time and duration or frequency of the activation of the conductor with electrical energy depend on the nature of the rotational vibration that is to be cancelled. The rotational vibration is preferably established and measured with the aid of a sensor. The sensor is connected with the control arrangement that can evaluate accordingly the signals generated by the sensor and can generate a suitable optimized control signal for the excitation of the conductor for the compensation of rotational vibrations.

In an embodiment of the invention, the conductor can be a component of a coil.

Advantageously, the permanent magnet is with respect to the conductor such that only radially running, or substantially radially running conductors are swept over by the magnetic field.

The sweeping over can take place here permanently. The latter applies in particular when the centrifugal mass body is mounted relative to the base body rotatably on the latter, and co-rotates with this. The sweeping over can also take place only temporarily, for example when the centrifugal mass body is mounted fixedly and the conductors, rotating together with the elastic element and the base body, only dip here temporarily into the magnetic field.

The special feature of the invention consists in coupling an electrodynamic actuator with an elastic element.

The elastic element can be adapted with regard to its vibration damping characteristics to the possibilities of use of the actuator for vibration compensation.

In particular, the elastic element can achieve a certain vibration compensation in a particular frequency range and/or in a particular amplitude range. In this embodiment, the actuator can be designed for a different or for the same frequency range and/or for different or for the same vibration amplitudes in the sense of an optimized rotational vibration compensation. By the combination of the elastic element with the electrodynamic actuator, a substantial improvement to the mode of operation of the actuator can be achieved.

For example, with the aid of the elastic element a reduction of amplitude peaks of the rotational vibrations can take place in a particularly advantageous manner, so that the actuator can be designed differently, namely in a more optimized manner, than if no elastic element were present.

Alternatively, the possibility also exists to construct the actuator so that amplitude peaks of the rotational vibrations, or particular frequency ranges of the rotational vibrations, are not to be damped, so that the elastic element for vibration damping can be designed optimally for example to an only very narrow-band frequency range.

By the combination of these two vibration damping mechanisms, a vibration damping can be achieved that is as a whole very advantageous, for example also very effective over a wide frequency range.

According to an advantageous embodiment of the invention, the actuator is connected in series to the elastic element. The series connection enables a particularly simple structural design of the device, and a particularly good forecasting of the vibration characteristics of the overall system.

According to an advantageous embodiment of the invention, the actuator—in relation to the energy transmission direction—is upstream of the elastic element. Through this arrangement, it can be brought about that rotational vibrations that are introduced on the drive side into the drive train first impact onto the actuator, before they reach the elastic element. Particular frequency ranges or particularly high amplitudes can be kept away from the elastic element for example with a corresponding design of the actuator.

According to an alternative embodiment of the invention, the actuator—in relation to the energy transmission direction—is downstream of the elastic element. Rotational vibrations in a particular frequency- and/or amplitude range are therefore—in so far as originating from the drive—first introduced into the elastic element and damped there, before they impact onto the actuator. The actuator can be protected here from particular frequency ranges or amplitudes.

Accordingly, an optimized technical design of the actuator can take place.

According to a further advantageous embodiment of the invention, at least two elastic elements are provided, and the actuator is between the two elastic elements.

According to a further embodiment of the invention, at least two actuator s are provided, and at least one elastic element is between the two actuator s.

Through these two previously described arrangements, a further improved compensation of rotational vibrations can be achieved between drive and load.

According to a further advantageous embodiment of the invention, the actuator is constructed substantially in a ring shape. Hereby, a particularly compact structural shape of the device can be made possible. In particular, the actuator can surround an axial partial section of the drive train in circumferential direction, whereby the axial structural length of the drive train can be kept small.

Further advantageously, provision is made that the actuator surrounds the elastic element in a ring shape. Hereby, an embodiment that is particular short in construction can become possible.

According to a further advantageous embodiment of the invention, at least one arrangement for the compensation of axial offset and/or radial offset and/or angular offset between the two connections is associated with the actuator and/or with the elastic element. For example, the elastic element can have a connection side that is configured with a membrane-like flange enabling radial offset. Hereby, a compensation of offset can be permitted.

BRIEF DESCRIPTION OF THE DRAWING

Further advantages of the invention will emerge from the non-cited subclaims and with the aid of the embodiments described below with the aid of the drawings. These show:

SPECIFIC DESCRIPTION OF THE INVENTION

Figure 1:
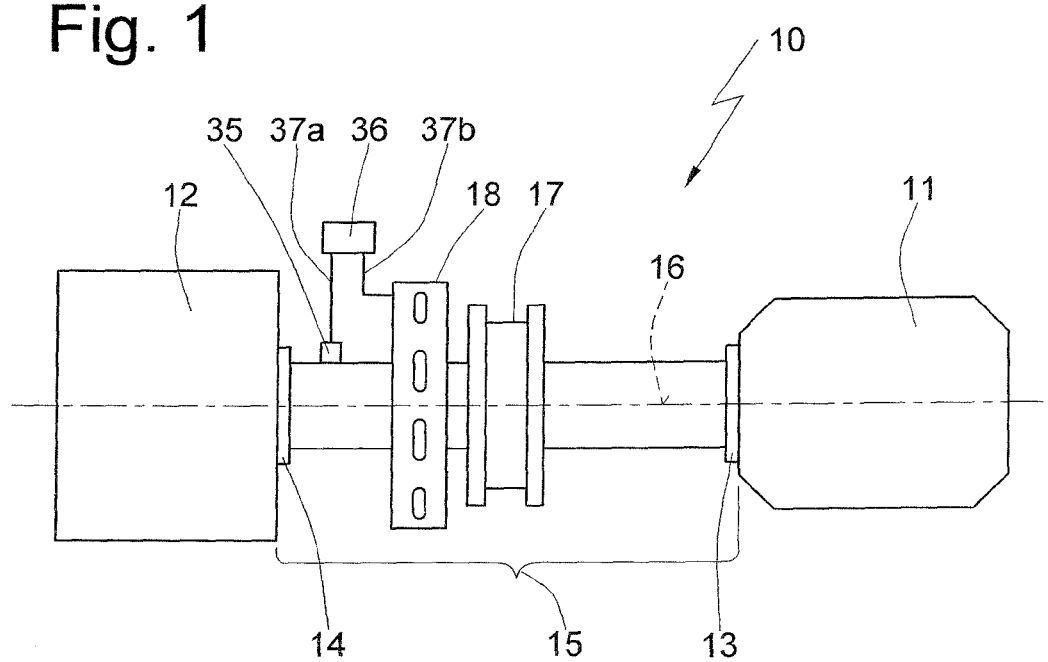
FIG. 1 in a diagrammatic illustration as a block diagram a first embodiment of a device according to the invention with an actuator and with an elastic element, FIG. 2 a further embodiment in a view like FIG. 1 where the actuator is upstream of the elastic element, FIG. 3 a further embodiment of the invention in a view like FIG. 1 with two elastic elements, FIG. 4 a further embodiment of a device according to the invention in a view like FIG. 1 where the actuator and the elastic element are aligned substantially along a shared radial plane, FIG. 5 a further embodiment of the invention in a view like FIG. 1 where two actuator s are provided, FIG. 6 a further embodiment of the invention, in a diagrammatic view partially in section, with a functional principle similar to the functional principle of FIG. 1, FIG. 7 a further embodiment of a device according to the invention in a view like FIG. 6 where the actuator surrounds an elastic element in a ring shape, similar to the illustration of FIG. 4, FIG. 8 a section through a further embodiment of an actuator, in a diagrammatic view partially in section, with a base body and a centrifugal mass body, FIG. 9 a coil that carries a conductor, in individual illustration, in a diagrammatic view partially in section, FIG. 10 a view approximately along view arrow X in FIG. 8 showing an arrangement with two permanent magnets in individual illustration, FIG. 11 a coil body and the permanent magnet arrangement approximately according to view arrow XI in FIG. 8 in a diagrammatic view in individual illustration partially in section, and FIG. 12 a part of the actuator with coil and permanent magnet arrangement in a diagrammatic view partially in section, approximately along view arrow XII in FIG. 8.

Embodiments of the invention are described by way of example in the following figure description, also with reference to the drawings. Here, for the sake of clarity—also in so far as different embodiments are concerned—identical or comparable parts or elements or regions are designated by the same reference numbers, partly with the addition of small letters.

Features that are only described in relation to one embodiment can also be provided within the scope of the invention in the case of each other embodiment. Embodiments that are altered in such a way are within the scope of the invention even when they are not illustrated in the drawings.

All disclosed features are, in themselves, essential to the invention. The disclosure content of the associated priority documents (copy of the prior application) and of the cited publications of the prior art is included herewith in full in the disclosure of the application, also for the purpose of including individual or several features of these documents into one or into several claims of the present application.

The device designated in its entirety by 10 in the figures is first explained with reference to the embodiment of FIG. 1:

FIG. 1 shows diagrammatically a motor 11, onto which a drive train 15 is fastened via a first connection 13, for example a flange 13, flanged directly onto the flywheel of the motor 11. The drive train 15 connects the motor 11 with the input side of a gear 12 with the aid of a second connection 14, for example again a flange 14.

An essential component of the drive train 15 is a device 10 of the type according to the invention. Such a device serves for transmitting torque from the motor 11 to a gear 12. The generic device is also designated as an elastic shaft coupling.

The embodiment of FIG. 1 comprises a shaft coupling 10 that has an elastic element 17 and, downstream of the elastic element 17 in relation to the energy-transmission path, an actuator 18.

The actuator 18 will be explained later in further detail. It serves to generate compensation torques on the occurrence of rotational vibrations in the drive train 15, to impose these compensation torques on the drive train 15, and hereby to compensate rotational vibrations, i.e. to reduce them as far as possible.

A sensor 35 that can be arranged for example directly on the drive train 15 is illustrated diagrammatically in FIG. 1. The sensor 35 is connected with a control arrangement 36 via an effective line 37a. As soon as rotational vibrations in the system 15 are determined at the sensor 35, or the control 36 arrangement calculates such rotational vibrations from the obtained measured values, the control arrangement 36 can calculate and introduce corresponding counter-measures. For this, a corresponding current signal or a voltage signal is sent to the actuator 18 from the control arrangement 36 via the effective line 37b. This brings about a flow of current through a conductor 32a, 32b that is to be further described later (FIG. 11) in the actuator 18, whereby on the basis of an electrodynamic active principle a portion of the actuator 18, the centrifugal mass body 26, is set in rotation relative to another portion of the actuator, the base body 25. Hereby, an angular momentum is generated. This angular momentum leads to a compensation angular momentum.

Rotational vibrations determined on the drive train 15 are thus superimposed by counter-vibrations, and are thereby cancelled as a whole or are largely cancelled.

The structure of the actuator 18 and the structure of the elastic element 17 are described later in further detail.

First, it is to be explained that the serially connected arrangement of the elastic element 17, i.e. of an element that owing to the material elasticity can already take vibration peaks from the drive train, or at least can bring about a certain damping in particular frequency ranges, with an actively controlled actuator 18, in this combination leads to a particularly optimized vibration cancellation.

It is noted, in addition, that the entire drive train 15 rotates about the diagrammatically indicated rotation axis 16. The actuator 18 therefore rotates with the drive train 15.

Figure 2:
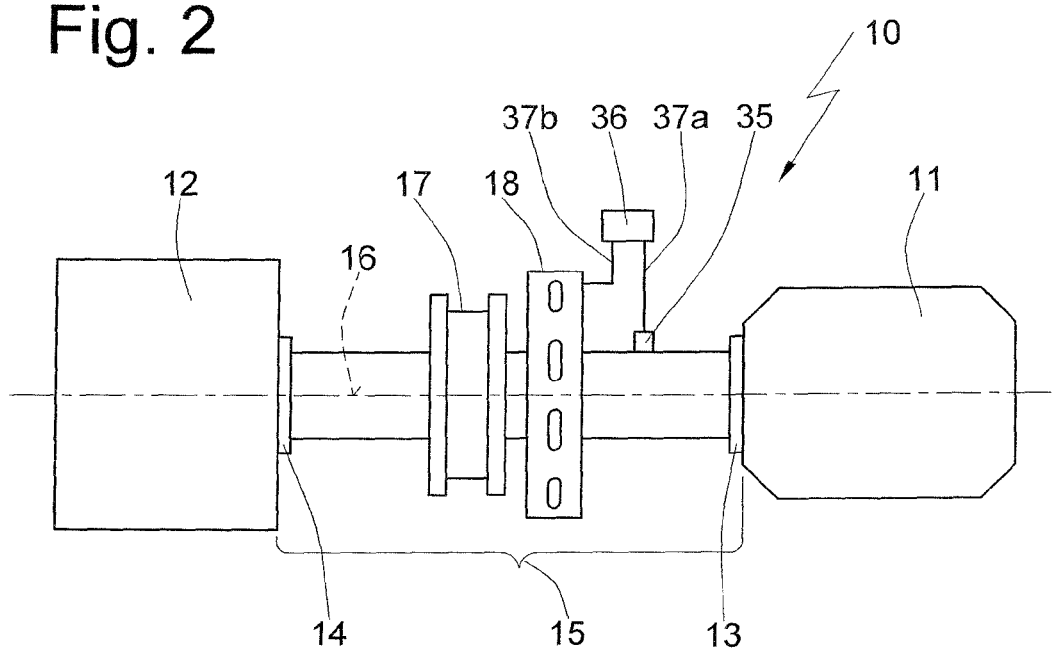

As shown in the embodiment of FIG. 2, it is explained that the serial connection of actuator 18 and elastic element 17 can also be made in a geometrically reversed sequence—with respect to FIG. 1. According to FIG. 2, the actuator 18 is upstream—in relation to the energy transmission flow—relative to the elastic element 17.

Figure 3:
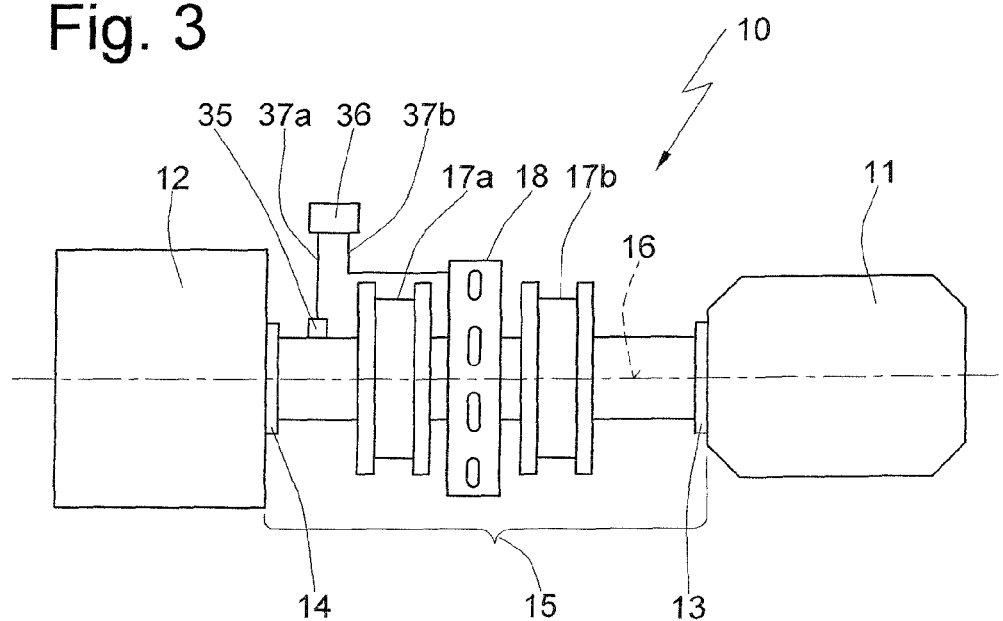

In a further embodiment of the invention according to FIG. 3, two elastic elements 17a, 17b are provided. The actuator 18 is between the two elastic elements 17a, 17b.

Figure 4:
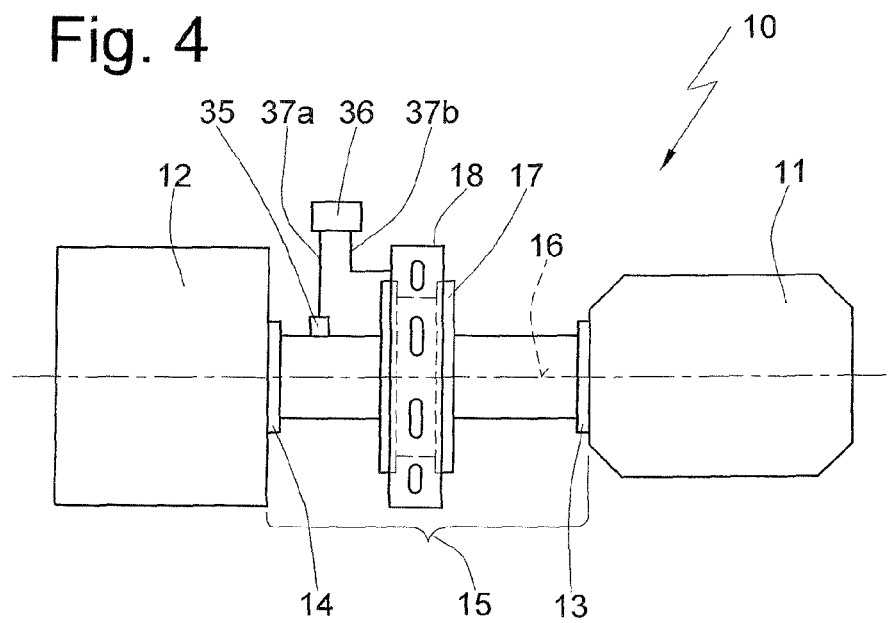

As shown in the embodiment of FIG. 4, to achieve a very compact construction that is axially short in structure, the actuator 18 can also be constructed substantially in the shape of an annular body, and can surround the elastic element 17 in a ring-shaped manner. Here, provision can be made that the actuator 18 and the elastic element 17 are along a shared radial plane.

Figure 5:
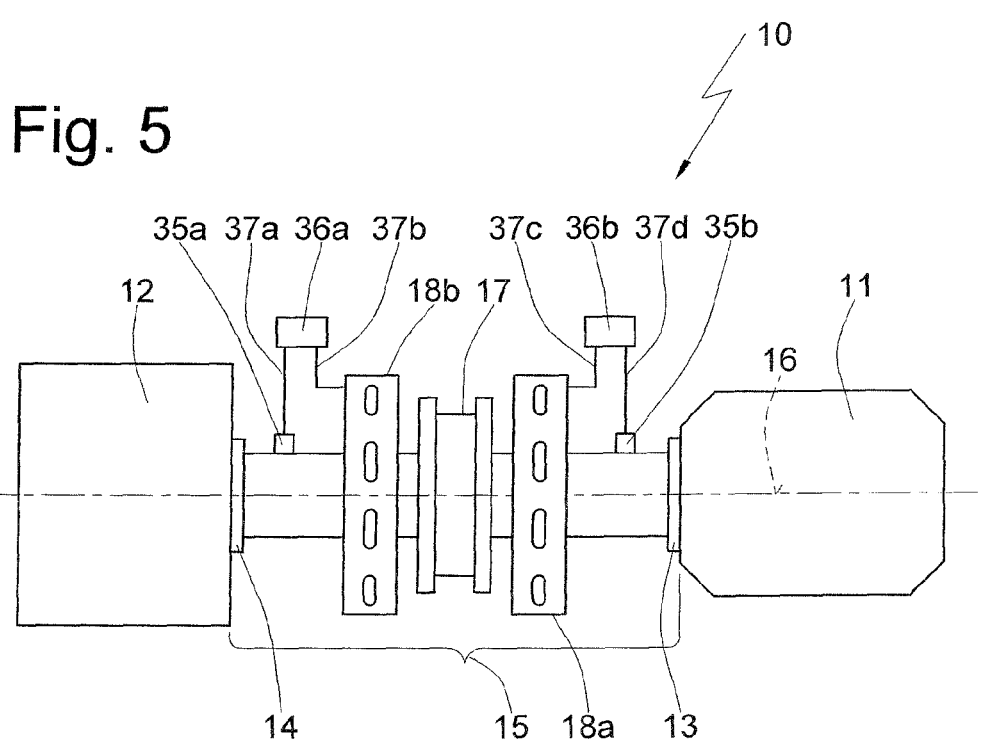

In the embodiment of FIG. 5, provision is made that an elastic element 17 is between a first actuator 18a and a second actuator 18b.

The invention also includes elastic shaft couplings 10, in which more than two actuator s 18a, 18b and/or more than two elastic elements 17a, 17b are provided.

Figure 6:
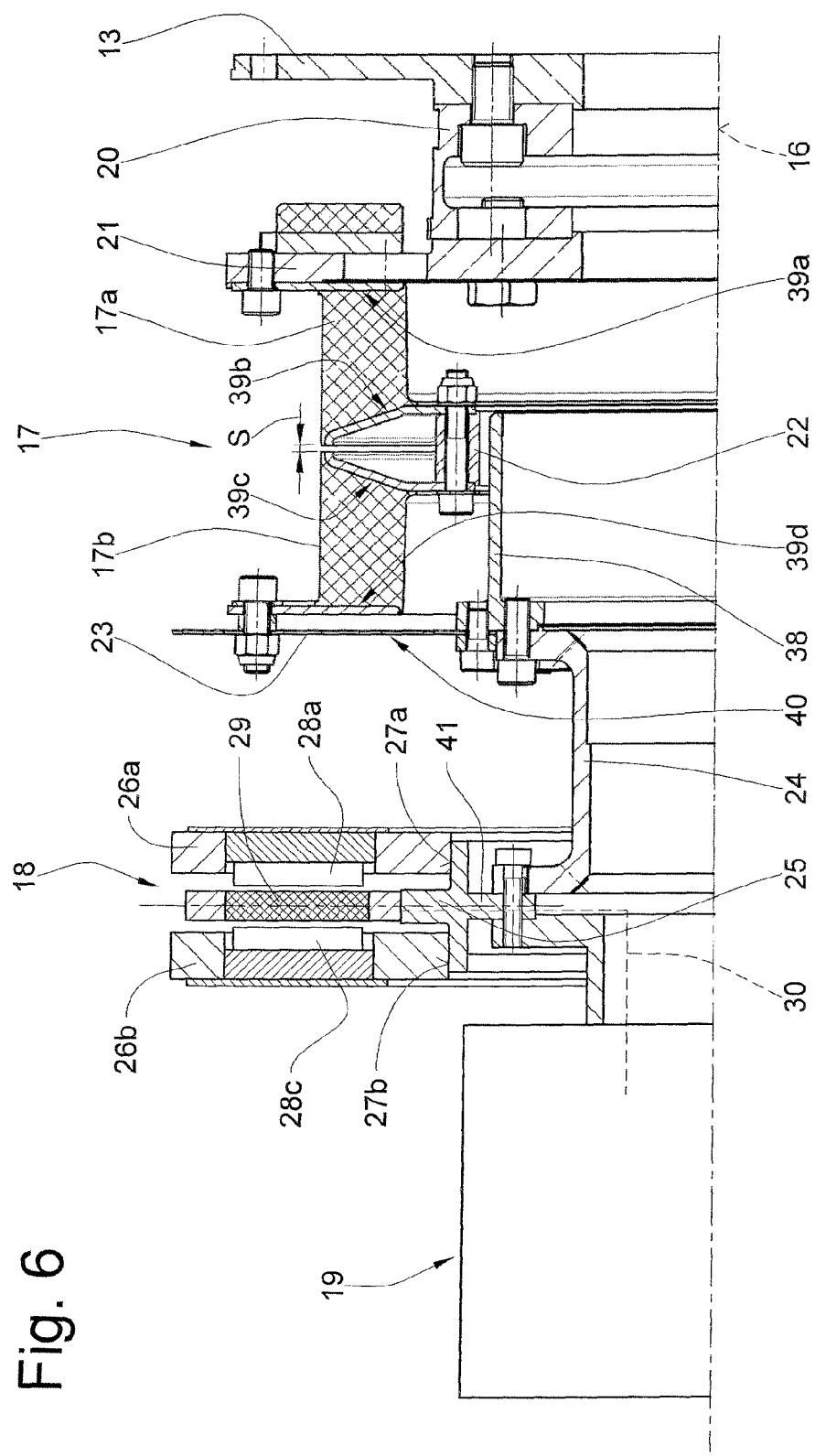

As shown in the embodiment of FIG. 6 that corresponds to FIG. 1 with respect to the serial arrangement of actuator 18 and elastic element 17, a series of structural details and characteristics of the shaft coupling 10 according to the invention are described:

As shown in FIG. 6, the device 10 according to the invention has a flange-like first connection 13, with which the device can be screwed directly onto the motor 11 that is not illustrated in FIG. 6. The first connection 13 is connected via an intermediate piece 20 with a connection flange 21 of the elastic element 17. The elastic element 17 is constructed substantially symmetrically, and comprises a left half 17b and a right half 17a. A gap S is between the two elastic elements 17a, 17b.

The two halves 17a, 17b of the elastic element 17 are securely connected with one another via a metallic intermediate piece 22, an intermediate flange.

The elastic element 17 is connected with a bearing sleeve 38 or with an intermediate piece 24 of the drive train 15 via a very flexible membrane ring flange 23.

The geometric construction of the elastic element 17 in the embodiment of FIG. 6 is only made by way of example. In other illustrated embodiments, the elastic element 17 has only one element consisting of rubber-elastic material and not, as in the embodiment of FIG. 6, two substantially ring-shaped elements consisting of rubber-elastic material.

It is noted that the rubber-elastic elements in the embodiment of FIG. 6 can be vulcanized onto the respective fastening elements (for example 21, 22) with their respective border regions 39a, 39b, 39c, 39d.

As shown in FIG. 6, an arrangement 40 is provided for achieving an angular offset compensation. In the embodiment of FIG. 6, a membrane flange 23 substantially in the shape of a circular ring is provided for this, which can be formed from a stable, but elastic, material, for example therefore metal or plastic. Through this membrane flange 23, an angular offset between the first connection 13 and the second connection 14 by a few degrees relative to the rotation axis 16 can be achieved. In particular, with the installation of a device 10 according to the invention into a structural space, for example in the case of a marine application into the engine compartment of a ship, mounting- and manufacturing tolerances can occur due to the structural space. These can be absorbed by the compensation arrangement 40.

The elastic elements 17, 17a, 17b can also provide to a certain extent for a radial compensation or axial compensation or an angular offset compensation. Other arrangements, not illustrated in the embodiment of FIG. 6, for axial, radial and angular offset compensation can be provided according to the invention.

With the aid of the embodiment of FIG. 6, an embodiment of an actuator 18 is now explained.

The actuator 18 comprises a base body 25 that is screwed with an inwardly projecting fastening flange 41 directly on the intermediate piece 24, i.e. a shaft of the drive train 15. The base body 25 is connected in this respect in a torque-proof manner with the drive train 15 rotating around the rotation axis 16.

A pivot bearing 27a, 27b in the form of two annular collars 27a, 27b projecting axially in both directions is formed on the base body 25. A centrifugal mass body 26 is mounted rotatably in circumferential direction on the two annular collars 27a, 27b. The centrifugal mass body 26 consists of two centrifugal mass body halves 26a, 26b that are constructed substantially identically and are facing one another. The two centrifugal mass body halves 26a, 26b are coupled with one another with regard to movement—which is not illustrated in FIG. 6.

The centrifugal mass body 26 is rotatable relative to the base body 25 along a predetermined limited circumferential angle range of e.g. +−10°. The centrifugal mass body 26 is, moreover, coupled with the base body 25 via spring elements that are not illustrated, and is prestressed by the spring elements in a rest- or middle position relative to the base body 25.

Through an electrodynamic excitation, the centrifugal mass body 26 can be mounted in circumferential direction—in both directions of rotation—relative to the base body 25, and can hereby exert an angular momentum onto the base body 25, and thereby act upon the drive train 15, and therefore also at the same time the device 10, with an angular momentum. This angular momentum is a compensation angular momentum to a rotational vibration regarded as intrusive, previously determined on the drive train 15.

In an embodiment of the invention, a plurality of coils 29 are provided on the base body 25, arranged equidistantly from one another in circumferential direction. FIG. 6—and also the further embodiments—show only one coil, for the sake of clarity.

In the embodiments, furthermore, two permanent magnets 28a, 28b are associated with each coil 29 in each centrifugal mass body half 26a, 26b. This geometric arrangement is also to be understood as being merely by way of example. The electromagnetic basic principle will be explained further later with the aid of FIGS. 8 to 12. From this, it will then become clear that the use of coils 29 is not necessary. In principle, a suitable arrangement of conductors 32a, 32b in a magnetic field is sufficient.

However, the basic principle of the electrodynamic actuator 18 is already now to be described:

For the case where a rotational vibration is determined on the drive train 15 via a sensor 35 that is indicated diagrammatically by way of example in FIG. 1, a compensation torque can be calculated by the control arrangement 36, and via the effective line 37b (FIG. 1) a corresponding signal can be conveyed to the coil 29. For this, a current rotary feedthrough 19 for current lines, indicated only diagrammatically, is indicated in FIG. 6.

The control 36—advantageously fixedly arranged—which is not illustrated in FIG. 6 is connected via the current rotary feedthrough 19 with an electric conductor 30 that—as indicated only diagrammatically in FIG. 6—is connected with the coil 29. The connection lines of the corresponding coil 29 are designated in FIGS. 9 and 12 by 34a or 34b. These connection lines 34a, 34b are electrically connected with the lines designated only diagrammatically by 30 in FIG. 6, or with the effective line 37b.

Due to the control arrangement 37, a current flows through corresponding conductors 32a, 32b (cf. FIG. 11). As the corresponding conductor is situated directly in a magnetic field generated by permanent magnets 28a, 28b, 28c, 28d, a Lorentz force is effective.

The permanent magnets 28a, 28b, 28c, 28 are in the two centrifugal mass body halves 26a, 26b likewise securely and distributed equidistantly in circumferential direction. As FIG. 11 makes clear, the permanent magnets 28a, 28b, 28c, 28d are arranged so that they overlap substantially completely, preferably approximately substantially centrally, a conductor 32a, 32b running substantially radially—in relation to the rotation axis 16.

The conductors 33a, 33b of the conductor loop 31 in the coil 29 (not shown in FIGS. 10-12), running in circumferential direction with respect thereto, are substantially outside the outer peripheries of the permanent magnets 28a, 28b, 28c, 28d.

As soon as the radially running conductors 32a, 32b are flowed through by current, a Lorentz force acts on the conductors 32a, 32b owing to the magnetic field generated by the permanent magnets 28a, 28b, 28c, 28d. This endeavors to move the conductors 32a, 32b out from the magnetic field, which is not possible, because the base body 25 is securely connected with the drive train 15, and rotates therewith about the rotation axis 16. Therefore, a force is generated onto the magnets 28a, 28b, 28c, 28d, which leads to the centrifugal mass body halves 26a, 26b being set in rotation relative to the secured base body 25. Hereby, a corresponding angular momentum is generated.

The type of activation of the conductors 32a, 32b by the control 37 is subject to more complicated algorithms and depends in particular on the rotational vibrations that are to be expected and are measured.

Through the arrangement of an elastic element 17, with the use of a body 17a, 17b of rubber-elastic material, the frequency range and the amplitude range of the rotational vibrations that are to be cancelled according to expectation, can be predetermined and predicted to a good extent.

Figure 7:
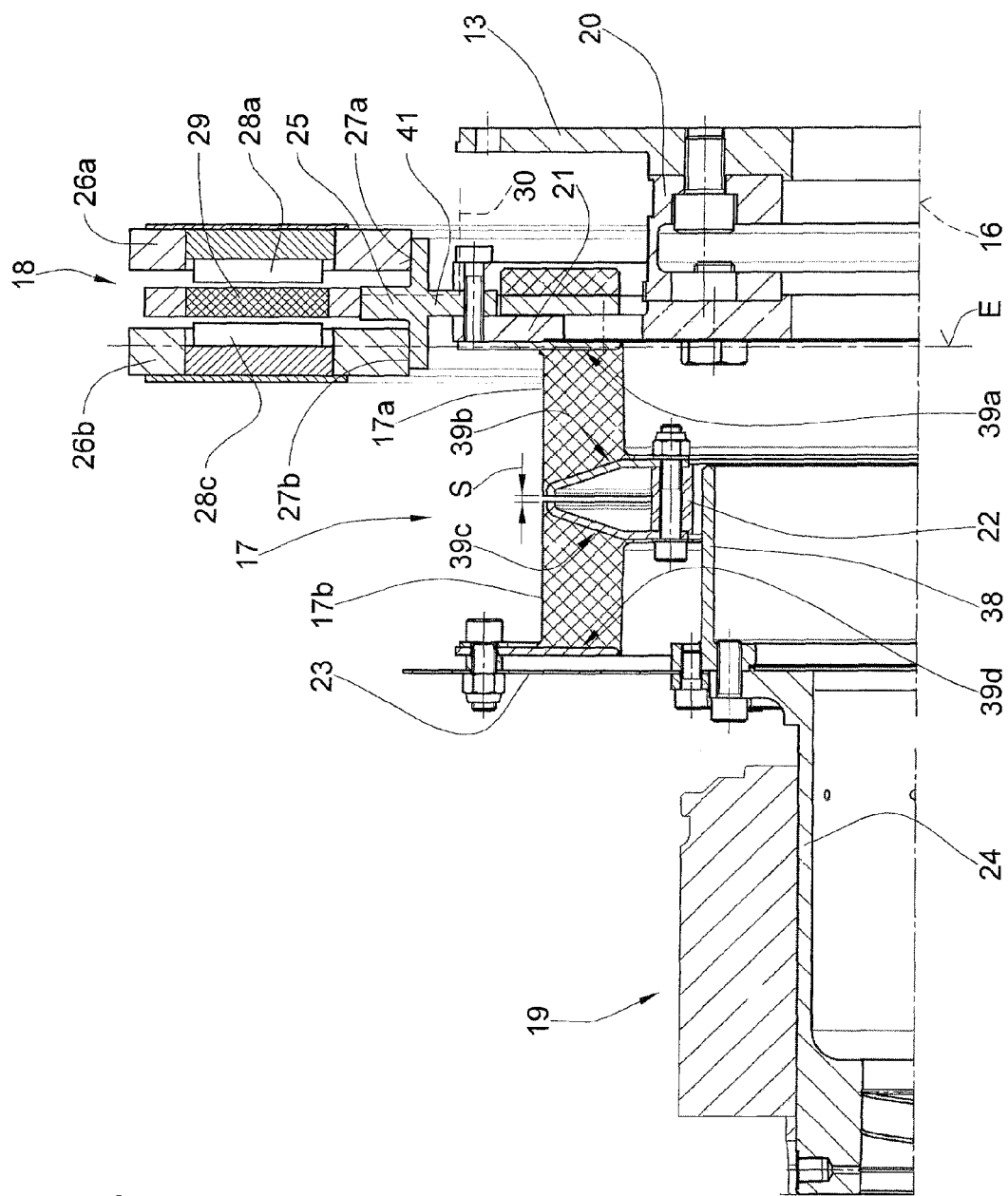

As shown by the embodiment of FIG. 7, a further embodiment is to be described, in which the device 10 of the type according to the invention can be constructed as a whole so as to be axially very short in structure. Here, the actuator 18 is constructed so as to be ring-shaped and surrounds a portion of the elastic element 17 substantially in a ring-shaped manner.

Both the actuator 18 and also the elastic element 17 are along a shared radial plane E. The normal vector of the plane E is provided by the rotation axis 16.

Figure 8:
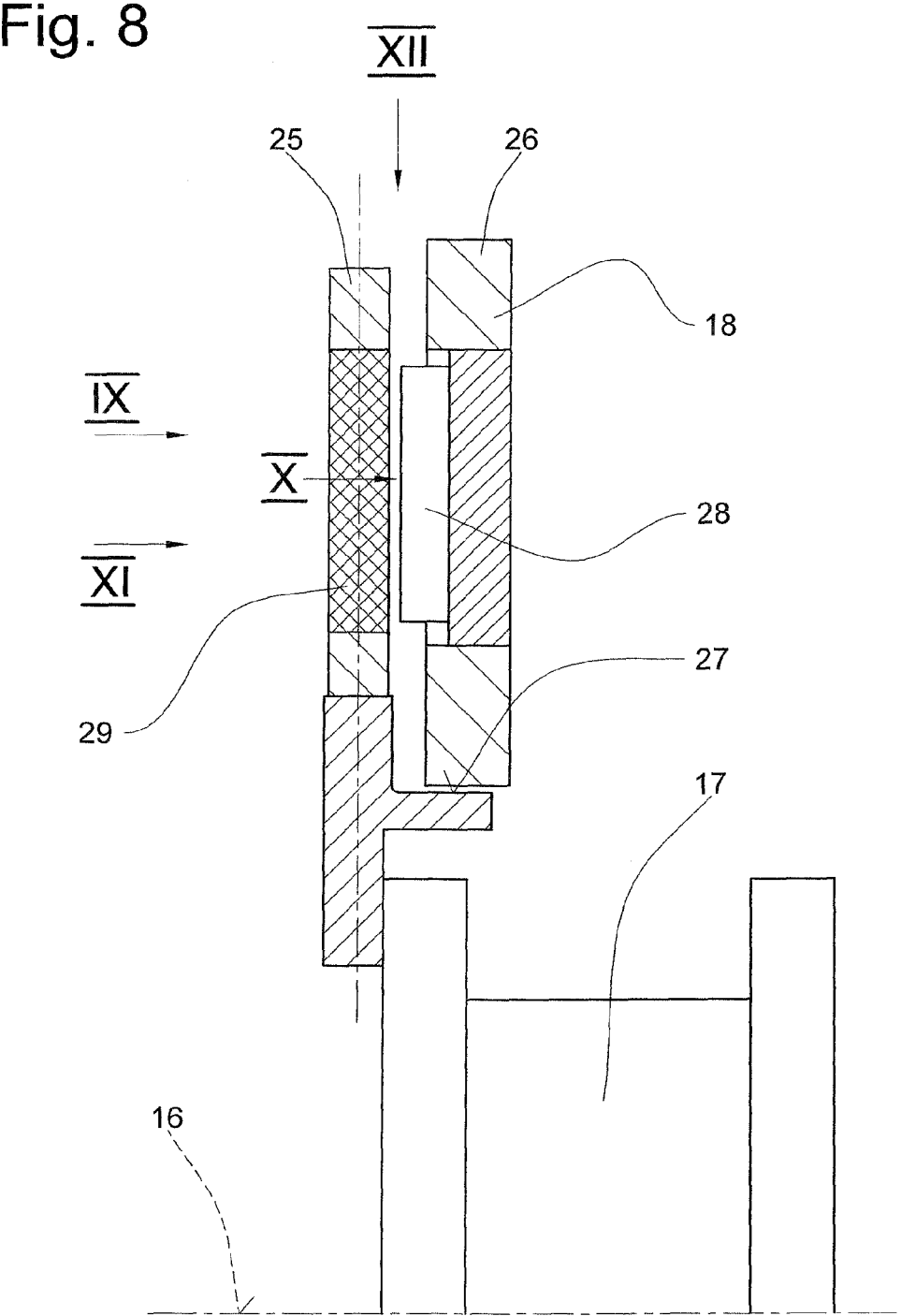

As shown in the embodiment of FIG. 8, it becomes clear that a coil body 29 and a pair arrangement of permanent magnets 28a, 28b lie directly opposite one another. FIG. 8 shows, in addition, that the actuator 18 can also have only one centrifugal mass body.

According to FIG. 9, a coil body 29 has a substantially trapezoidal shape, widening outwards in radial direction. The conductor loop 31 can have a plurality of windings, and for example can be wound in the form of a circular ring.

By comparison, FIG. 11 makes it clear that the coil 29 in an advantageous embodiment of the invention can also be wound differently, and the conductor loop 31 can adapt itself with regard to its contours to the trapezoidal contour of the body 29 as a whole.

On comparative observation of FIGS. 8 to 12, it becomes clear that the conductors 32a, 32b that run substantially radially and are within the contour of the magnets 28a, 28b, contribute to the generation of the compensation angular momentum.

As shown by FIG. 12, it can be seen that the two permanent magnets 28a, 28b are reversed in pairs, so that a substantially closed magnetic flux is produced.

Furthermore, 42 designates a back iron plate, by which the magnetic field lines can be closed.

The left side of the actuator 18, not illustrated in detail in FIG. 12, can contribute, with the aid of a further centrifugal mass body 26b using a further pair of magnets 28a, 28b, to the complete closure of the magnet lines, as indicated by the dashed arrow.

If current now flows through a conductor 32a, 32b, the Lorentz force then comes into action, as is known, and provides for an application of angular force onto the centrifugal mass body 26 in one or other rotation direction according to the current direction.

In the knowledge of the frequencies and amplitudes of the rotational vibrations measured in the drive train, the compensation vibrations can be calculated and generated.

Depending on the selection of the structure of the circuit of actuator and elastic element, a positioning of the sensor 35 can be provided upstream or downstream of the elastic element 17 and/or upstream or downstream of the actuator 18.

The combination of an electrodynamic actuator 18 with an elastic element 17 enables in this respect an optimized compensation of rotational vibrations.

Furthermore, this combination of an electrodynamic actuator 18 with an elastic element 17 also enables the provision of a certain safeguarding against failure. If the electrodynamic actuator were to fail completely, at least one elastic element is provided that to a certain extent can receive or compensate rotational vibrations alone—in the case of the failure of the actuator.

The invention claimed is:

1. A device for transmitting torque from a drive to a load, the device comprising:
    a first connection for connection with the drive;
    a second connection for connection with the load;
    at least one elastic element for vibration damping and between the two connections in the energy transmission path;
    an actuator element associated with the elastic element and having at least one base body and a centrifugal mass body rotatable relative thereto;
    at least one conductor section on one of the two bodies; and
    at least one permanent magnet on the other of the two bodies, the conductor section being positionable in the magnetic field such that, when current flows through the conductor section, the base body is able to be acted upon by an angular momentum generated by the centrifugal mass body in the sense of a compensation of rotational vibrations.

2. The device according to claim 1, wherein the actuator element is connected in series to the elastic element.

3. The device according to claim 2, wherein the actuator element is arranged—in relation to the energy transmission direction—upstream of the elastic element.

4. The device according to claim 2, wherein the actuator element is arranged—in relation to the energy transmission direction—downstream of the elastic element.

5. The device according to claim 1, wherein at least two elastic elements are provided, and that the actuator element is arranged between the two elastic elements.

6. The device according to claim 1, wherein at least two actuator elements are provided, and that at least one elastic element is arranged between the two actuator elements.

7. The device according to claim 1, wherein the actuator element is a ring.

8. The device according to claim 1, wherein the actuator element annularly surrounds the elastic element.

9. The device according to claim 1, wherein there is associated with the actuator element and/or with the elastic element at least one arrangement for the compensation of axial, radial or angular offset between the two connections.

10. A coupling for transmitting torque from a drive to a load, the coupling comprising:
    a first connection for connection with the drive;
    a second connection for connection with the load;
    an elastic element for vibration damping and between the first and second connections in the energy transmission path therebetween; and
    an actuator carried on the elastic element and having a base body and a centrifugal mass body rotatable relative thereto, one of the bodies carrying an electrical conductor and the other of the bodies carrying a permanent magnet, the conductor being in a magnetic field of the permanent magnet such that, when current flows through the conductor, the centrifugal mass body exerts an angular force on the base body to compensate for rotational vibrations.

* * * * *